Dec. 15, 1936.  W. A. HEHN  2,064,259
DAIRY SEDIMENT FILTER
Filed July 12, 1935   3 Sheets-Sheet 2
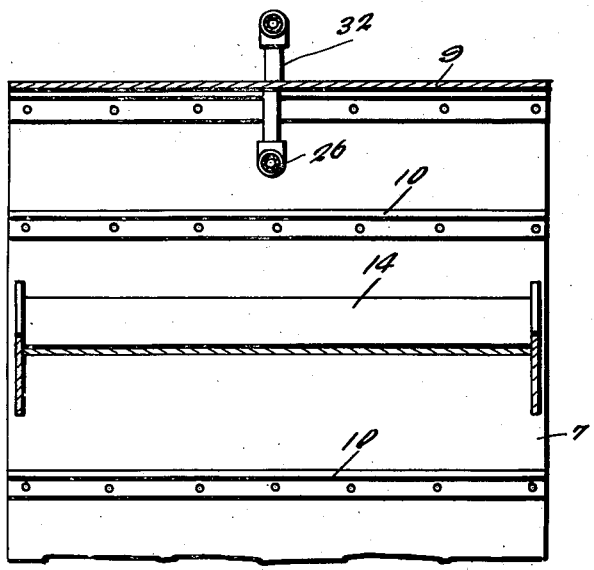
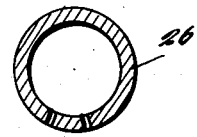
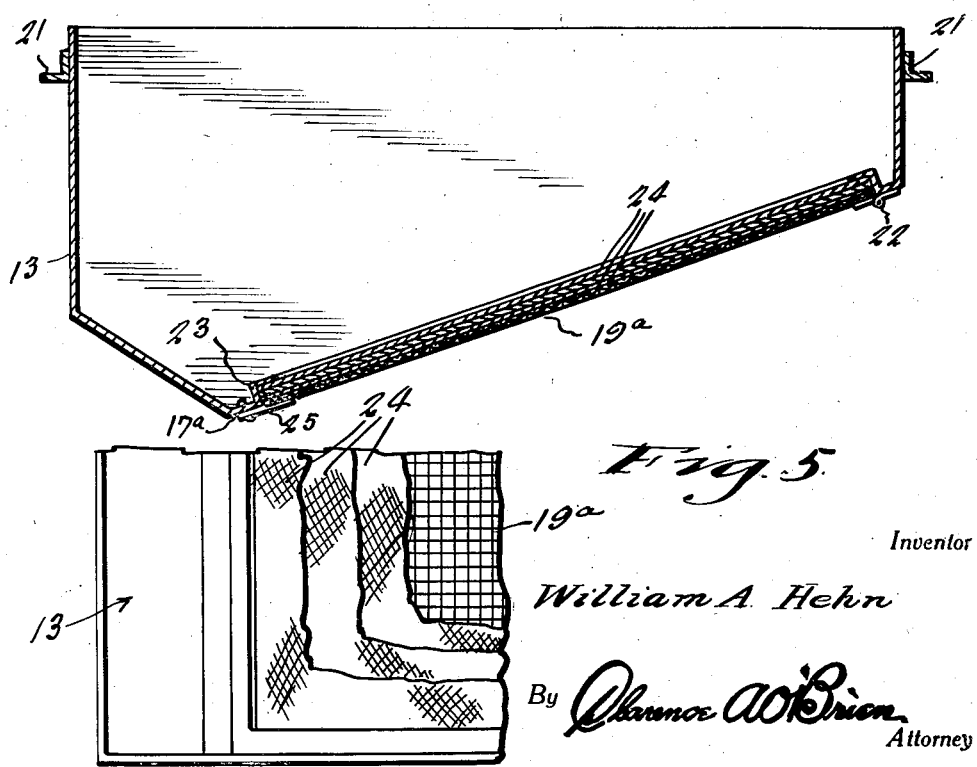
Inventor
William A. Hehn
By Clarence A O'Brien
Attorney Dec. 15, 1936.   W. A. HEHN   2,064,259
DAIRY SEDIMENT FILTER
Filed July 12, 1935   3 Sheets-Sheet 3
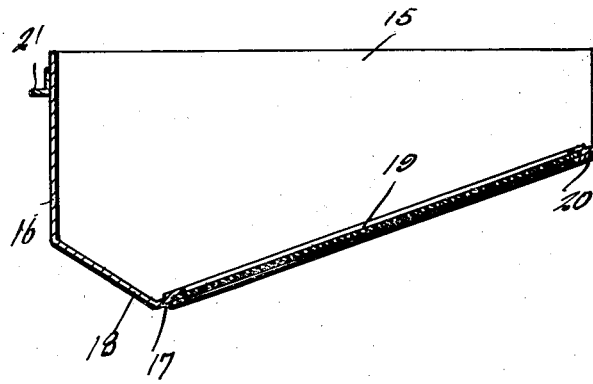
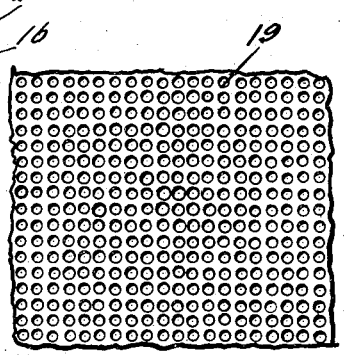
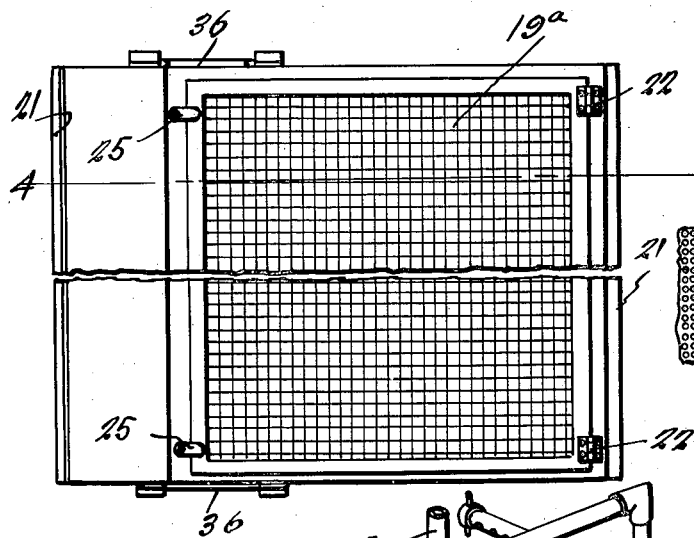
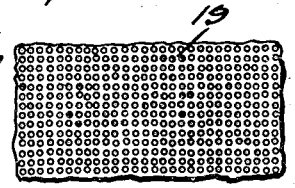
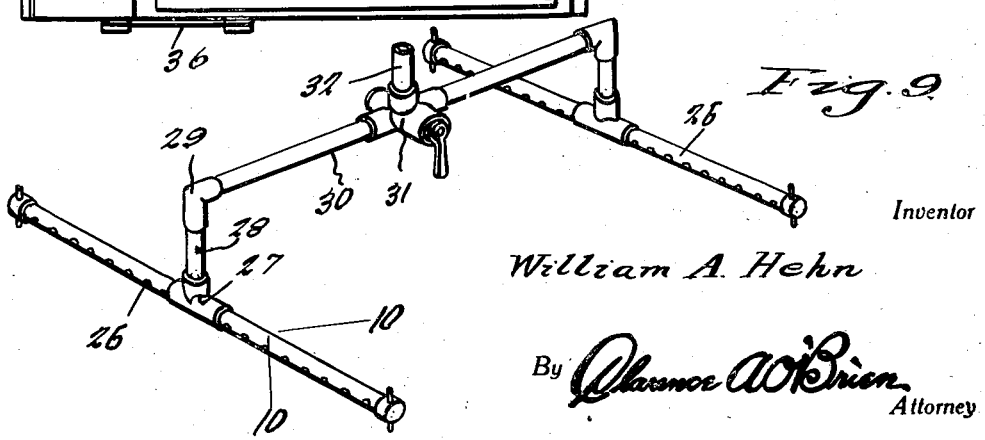
Inventor
William A. Hehn
By Clarence A. O'Brien
Attorney Patented Dec. 15, 1936

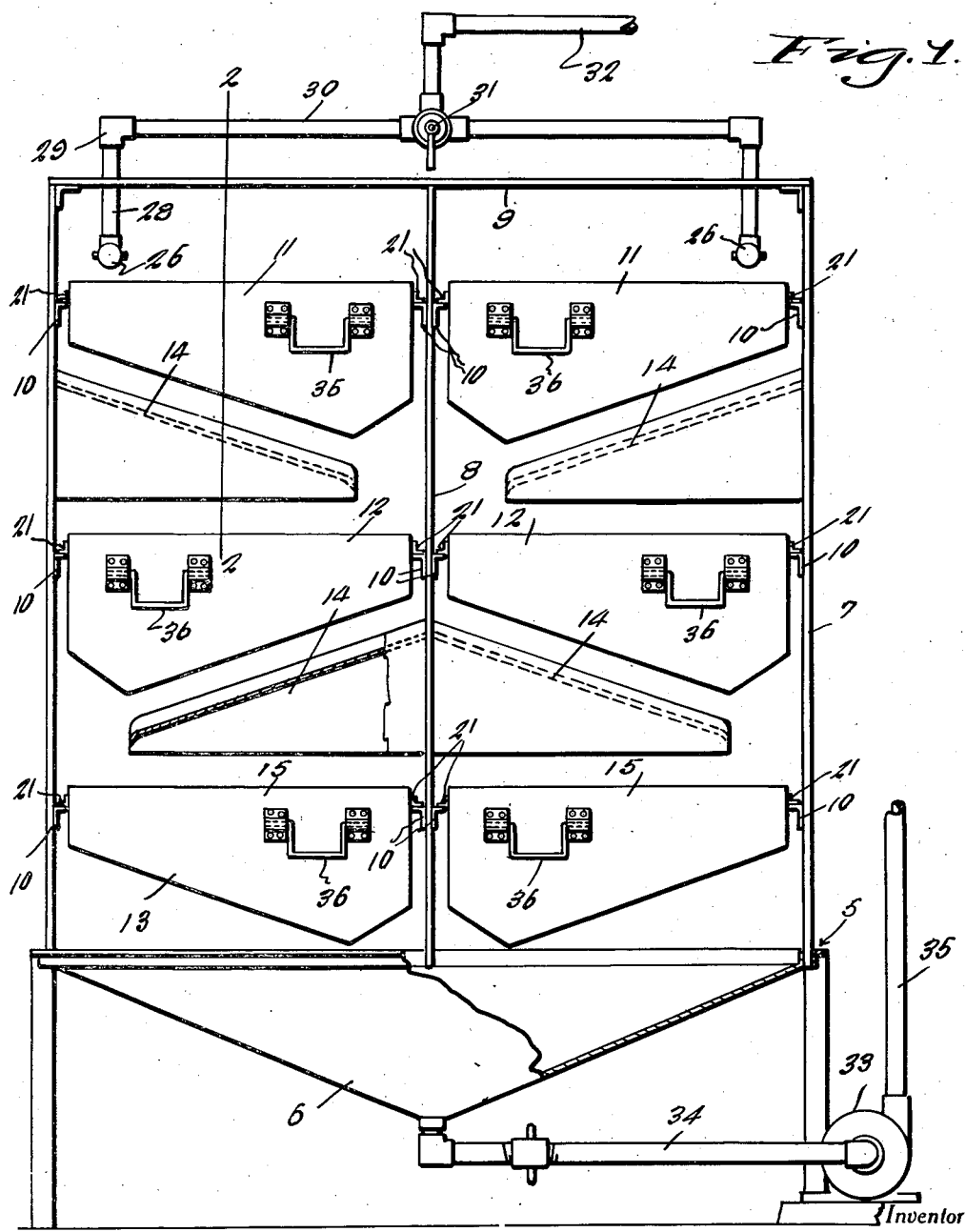

2,064,259

UNITED STATES PATENT OFFICE 2,064,259

DAIRY SEDIMENT FILTER

William A. Hehn, Jamestown, N. Dak.

Application July 12, 1935, Serial No. 31,114

2 Claims. (Cl. 210—149)

This invention relates to filtering devices and the object of the invention is to provide a filter for filtering sediment from pasteurized cream.

A further object of the invention is to provide a gravity flow filter which will insure the removal of the finest sediment from the cream.

The invention together with its objects and advantages will be best understood from a study of the following description taken in connection with the accompanying drawings wherein:

Figure 1 is an elevational view of a filter embodying the features of the present invention certain parts being broken away and shown in section.

Figure 2 is a sectional view taken substantially on line 2—2 of Figure 1.

Figure 3 is a bottom plan view of a bottom filtering pan.

Figure 4 is a sectional view taken substantially on the line 4—4 of Figure 3.

Figure 5 is a fragmentary detail plan view through the filtering pan shown in Figure 3 illustrating certain details hereinafter more fully referred to.

Figure 6 is a view similar to Figure 4 taken through one of the upper filtering pans.

Figure 7 is a fragmentary plan view of the screen shown in the uppermost filtering pan.

Figure 8 is a view similar to Figure 7 of the screen in the bottom of the intermediate filtering pan.

Figure 9 is a perspective view of a feed nozzle assembly.

Figure 10 is a detail view taken substantially on the line 10—10 of Figure 9.

Referring to the drawings by reference numerals it will be seen that the filtering device comprises a leg supported table 5 which supports a substantially frustro-conical receiving pan or tray 6.

Rising from the table 5 is a frame structure consisting of end members 7 and an intermediate member 8. At their upper ends the members 7 and 8 are connected by a top plate 9.

Provided on the members 7 and 8 are vertical series of spaced angle iron rails 10.

Supported within the frame structure at opposite sides of the intermediate member 8 is a vertical series of filtering or strainer pans indicated respectively by the reference numerals 11, 12 and 13.

Arranged in alternate relation to the filtering pans are inclined troughs 14, the uppermost trough 14 extending inwardly from a frame member 7, and the lowermost trough 14 extending laterally from the intermediate frame member 8.

Each of the troughs consists of a pair of side members and an inclined bottom as clearly shown.

The pans or trays 11 and 12 are substantially identical in construction, the same being substantially rectangular in top plan, having side walls 15, end walls 16, and a bottom wall having a relatively elongated inclined portion 17 and a shorter inclined portion 18. The portions 17 and 18 at the bottom wall are in synclinal relation as clearly shown in Figure 6. Also the section 17 of the bottom wall is provided with an opening over which is disposed a screen 19 secured in place in any suitable manner as for example by a suitable frame 20.

The screen 19 in the bottom of the pan 11, as shown in Figure 7 consists of a sheet of metal provided with a multiplicity of relatively wide openings or apertures, while the screen 9 in the bottom of the pan 12 as shown in Figure 8 also consists of a sheet of metal, but having relatively small apertures as shown. Thus the pans 11 and 12 as shown in Figure 1 are disposed with the bottom sections 17 disposed in overlying relation to the trough 14 so that each trough serves to receive the filtered milk from an upper pan and direct it to the next lowermost pan.

At the walls 16 thereof each pan is provided with angle bars 21 which cooperate with the angle bars 10 in a manner clearly shown in Figure 1 for slidably supporting the pans in position in the fame.

The pans 13 are different from the pans 11 and 12 only in that the screen 19a is of wire mesh and is hinged at one end as at 22 as shown in Figure 4. Also the bottom section 17a of the pan 13 has the opening closed by the screen 19a rimmed by a flange 23 that has an inwardly turned edge cooperating with the screen 19a for clamping in position and over the screen 19a a plurality of plies 24 of "cheese cloth" or other suitable filtering material.

Latch means 25 are provided for retaining the screen 19a and cloth 24 in position with respect to the opening in the bottom of the tray or pan 13.

Disposed over the pans 11 are elongated perforated tubular feed nozzles 26 connected by T-fittings 27, nipples 28, and elbows 29 with a pipe 30. Provided in the pipe 30 is a suitable valve 31, one side of which is connected with a supply pipe 32.

As is thought apparent and as will be hereinafter more fully explained, the cream to be filtered is discharged into the uppermost tray 11 at one side of the device from the proper nozzle 26 and filtered through the trays into the trough or receptacle 6.

From the trough or receptacle 6 the filtered cream is drawn off through the medium of a pump 33 and suitable piping 34 and 35 respectively and under pressure conveyed to the cooler or the like provided therefor.

To facilitate handling of the trays each is provided at either or both ends thereof with suitable handles 36.

From the above it will be apparent that either or both sides of the filtering device may be used. However it will be found more desirable to use but one side of the filtering device at a time so that while one side of the filtering device is being used the trays at the other side may be cleansed for sanitary purposes.

For filtering the cream the valve 31 is placed in proper position so as to permit the cream from the source of supply to flow through the pipe 30 in the proper direction and discharge through the nozzle 26 into the first tray 11. In this tray the first filtering action takes place, the cream passing through the screen 19 on to the trough 14. The trough 14 directs the filtered cream into the tray 12 where a second filtering operation takes place. Passing from the tray 12 the cream is directed by the lowermost trough 14 into the pan 13 where a thorough finer filtering of the cream takes place. From the tray 13 the cream filters through the cloth 24 and screen 19a into the receptacle 6. From the receptacle 6 the filtered cream is drawn off and cooled.

Having thus described my invention, what I claim as new is:

1. A dairy sediment filter comprising a frame like supporting structure, a receptacle for receiving the filtered material mounted in the bottom of the supporting structure, two parallel series of alternately arranged filtering trays and troughs mounted in the structure above said receptacle, each of said trays having sides and ends and a bottom, said bottom including a relatively long section and a relatively short section, said bottom sections being arranged in synclinal relation, and the long bottom section being provided with an opening and a filtering screen disposed over the opening; and each of said troughs having an inclined bottom in spaced parallel relation to the long bottom section of the next adjacent upper tray, and spaced therefrom a distance sufficient to permit the fluid filtering through the screen of the tray to contact with atmospheric air for aerating the material being filtered during the filtering thereof, the troughs in each section sloping in reverse directions relative to one another and the trays in each series being reversely disposed with respect to one another; and conduit means for directing either the material to be filtered or a cleansing fluid in alternation to each series of trays and troughs.

2. A dairy sediment filter comprising a frame like supporting structure, a receptacle for receiving the filtered material mounted in the bottom of the supporting structure, two parallel series of alternately arranged filtering trays and troughs mounted in the structure above said receptacle, each of said trays having sides and ends and a bottom, said bottom including a relatively long section and a relatively short section, said bottom sections being arranged in synclinal relation, and the long bottom section being provided with an opening and a filtering screen disposed over the opening; and each of said troughs having an inclined bottom in spaced parallel relation to the long bottom section of the next adjacent upper tray, and spaced therefrom a distance sufficient to permit the fluid filtering through the screen of the tray to contact with atmospheric air for aerating the material being filtered during the filtering thereof, the troughs in each section sloping in reverse directions relative to one another and the trays in each series being reversely disposed with respect to one another; elongated tubular feed nozzles disposed transversely of the uppermost trays in said series, piping connecting the nozzles together and with a suitable source of supply, and valve means arranged in the piping and of such a construction as to control the flow through the piping for directing the flow either to a selected nozzle or to both of the nozzles simultaneously.

WILLIAM A. HEHN.